US011695646B1

(12) United States Patent
Lin et al.

(10) Patent No.: US 11,695,646 B1
(45) Date of Patent: Jul. 4, 2023

(54) LATENCY IN EDGE COMPUTING

(71) Applicant: International Business Machines Corporation, Armonk, NY (US)

(72) Inventors: Hui Lin, Beijing (CN); Jun Yang, Beijing (CN); Jing James Xu, Xi'an (CN); Yue Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/656,509

(22) Filed: Mar. 25, 2022

(51) Int. Cl.
*G06F 15/16* (2006.01)
*H04L 41/16* (2022.01)
*H04L 67/10* (2022.01)

(52) U.S. Cl.
CPC .............. *H04L 41/16* (2013.01); *H04L 67/10* (2013.01)

(58) Field of Classification Search
CPC ................................ H04L 41/16; H04L 67/10
See application file for complete search history.

(56) References Cited

U.S. PATENT DOCUMENTS 10,440,096 B2  10/2019  Sabella
2019/0020657 A1*  1/2019  Egner ................. H04W 12/009

FOREIGN PATENT DOCUMENTS

WO   WO-2017067586 A1 *  4/2017

OTHER PUBLICATIONS

Abbas et al., "Meta-heuristic-based offloading task optimization in mobile edge computing", International Journal of Distributed Sensor Networks 2021, vol. 17(6), 11 pages, <https://journals.sagepub.com/doi/full/10.1177/15501477211023021>.
Ale et al., "Delay-aware and Energy-Efficient Computation Offloading in Mobile Edge Computing Using Deep Reinforcement Learning", arXiv:2103.07811v1 [cs.NI] Mar. 13, 2021, 14 pages.
Chen et al., "Task Offloading for Mobile Edge Computing in Software Defined Ultra-Dense Network", 0733-8716 (c) 2018 IEEE, 12 pages, <https://ieeexplore.ieee.org/abstract/document/8314696>.
Mell et al., "The NIST Definition of Cloud Computing", NIST National Institute of Standards and Technology U.S. Department of Commerce, Special Publication 800-145, Sep. 2011, 7 pages.
Wang et al., "Joint Offloading and Computing Optimization in Wireless Powered Mobile-Edge Computing Systems", 1536-1276 (c) 2017 IEEE, 14 pages, <https://ieeexplore.ieee.org/abstract/document/8234686>.
Wang et al., "Urban Traffic Signal System Control Structural Optimization Based on Network Analysis", Hindawi Publishing Corporation, Mathematical Problems in Engineering, vol. 2013, Article ID, Accepted Nov. 3, 2013, 10 pages.

(Continued)

*Primary Examiner* — Padma Mundur
(74) *Attorney, Agent, or Firm* — Stephen R. Yoder

(57) ABSTRACT

Deep reinforcement learning is applied to self-orchestration in edge device computing for offloading within a spatial network community to reduce latency and bandwidth issues. A revised online policy gradient training algorithm based on importance sampling in addition to the use of DRL-based offloading provides for continued use of original sample training data. A request for help scheme supports edge-device cooperation among neighboring devices of the spatial network community by sharing edge device state information (EDSI) for governing task assignments.

20 Claims, 11 Drawing Sheets

(56) References Cited

OTHER PUBLICATIONS

Xu et al., "Optimal Offloading Decision Strategies and Their Influence Analysis of Mobile Edge Computing", Sensors 2019, MDPI, Published: Jul. 23, 2019, 13 pages, <https://www.ncbi.nlm.nih.gov/pmc/articles/PMC6679515/>.
Zhang et al., "Ultra-Low Latency Multi-Task Offloading in Mobile Edge Computing", IEEE Access, date of current version Mar. 2, 2021, 13 pages, <https://ieeexplore.ieee.org/document/9360636>.
Zheng et al., "Reinforcement Learning-Based Workload Scheduling for Edge Computing", accessed on Dec. 29, 2021, 10 pages, <https://www.researchgate.net/publication/350507363_Reinforcement_Learning-Based_Workload_Scheduling_for_Edge_Computing>.

* cited by examiner

LATENCY IN EDGE COMPUTING

BACKGROUND

The present invention relates generally to the field of computing and wireless communications, and more particularly to spatial network communities in edge computing.

Accelerating the development of the 5G (fifth generation) network and internet of things (IoT) application, edge computing is designed to provide for computation-intensive and latency-sensitive applications through task offloading. Many applications require both very low and predictable latency, including application such as: (i) geo-distributed applications such as pipeline monitoring and sensor networks to monitor the environment; (ii) fast mobile applications such as smart connected vehicles; and (iii) large-scale distributed control systems such as a smart grid, a connected rail system, and smart traffic light systems.

A spatial network, sometimes referred to as a geometric graph, is a graph in which the vertices or edges are spatial elements associated with geometric objects. The nodes of the graph are in a space that is equipped with a certain metric. The simplest mathematical realization of a spatial network is a lattice or a random geometric graph where nodes are distributed uniformly at random over a two-dimensional plane. With respect to the graph, a pair of nodes are connected if the Euclidean distance is smaller than a specified neighborhood radius. Transportation and mobility networks and power grids are some applications where the underlying space is relevant and where the topology alone does not contain all the critical information.

SUMMARY

According to an aspect of the present invention, there is a method, computer program product and/or system for edge orchestration in a spatial network community that performs the following operations (not necessarily in the following order): (i) identifying a first task in a local task queue of a first edge device, the first task being assigned to a first class; (ii) determining to perform the first task by remote execution at an edge device selected from a plurality of edge devices within the spatial network community; (iii) sending a request for help signal to a sub-set of edge devices in the plurality of edge devices, the sub-set of edge devices having characteristics aligned with requirements of the assigned first class; and (iv) offloading the first task to a select edge device based on a response to the request for help signal returned by the select edge device.

According to another aspect of the present invention, there is a method, computer program product and/or system for edge orchestration in a spatial network community that performs additional operations: (i) establishing a parameter-shared deep neural network (DNN) architecture by (a) initializing a first DNN for a local deep reinforcement learning (DRL) network; and (b) initializing a second DNN for a local DRL network. The local DRL network is based on online deep policy gradient algorithm with importance sampling with reference to an old sample data of an existing policy. The remote DRL network is based on a DRL-based offloading schedule with the old sample data being replace with new sample data for each training epoch.

DETAILED DESCRIPTION

Figure 1:
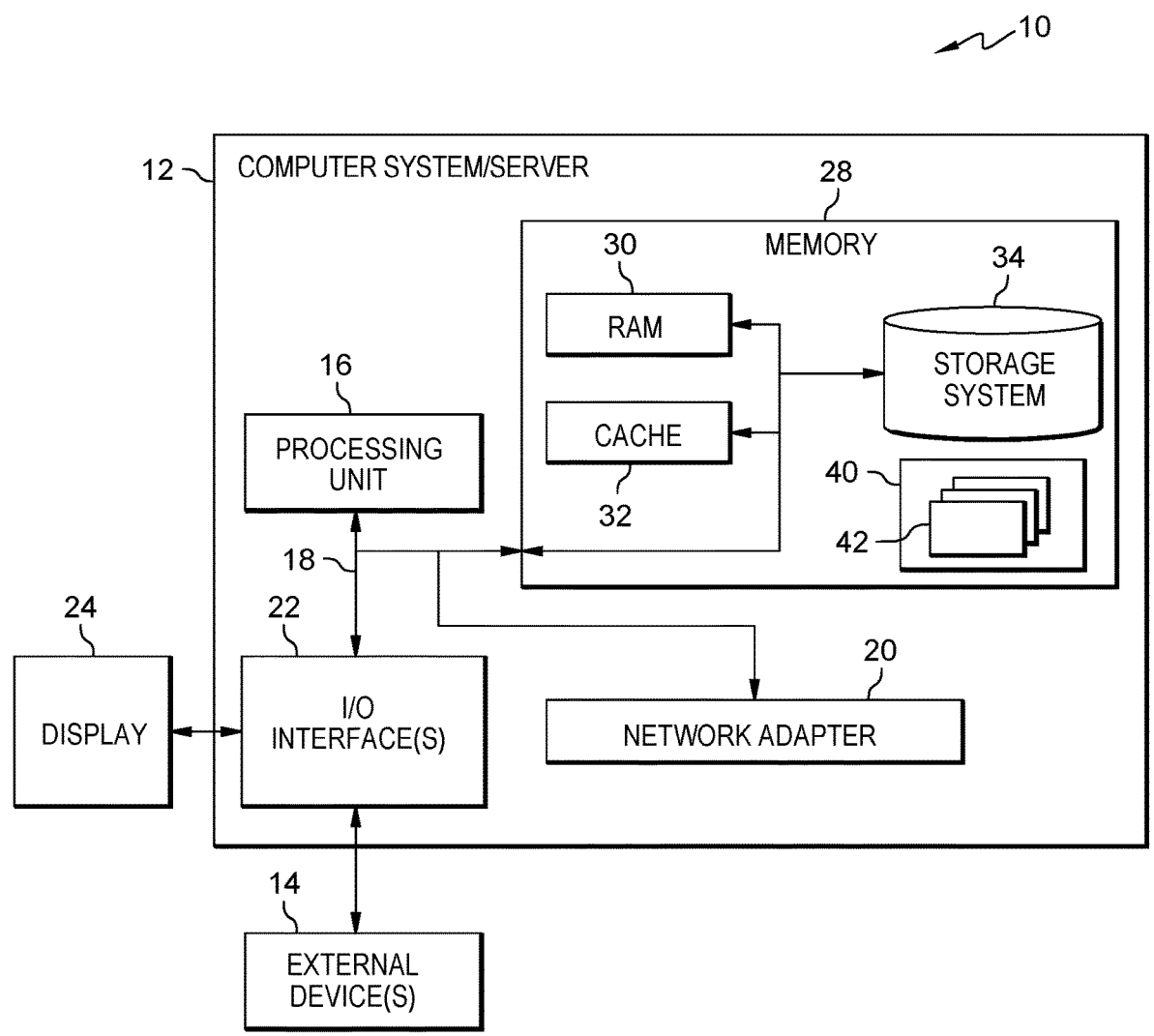
FIG. 1 depicts a cloud computing node used in a first embodiment of a system according to the present invention.

Deep reinforcement learning is applied to self-orchestration in edge device computing for offloading within a spatial network community to reduce latency and bandwidth issues. A revised online policy gradient training algorithm based on importance sampling in addition to the use of DRL-based offloading provides for continued use of original sample training data. A request for help scheme supports edge-device cooperation among neighboring devices of the spatial network community by sharing edge device state information (EDSI) for governing task assignments. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and tablets).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
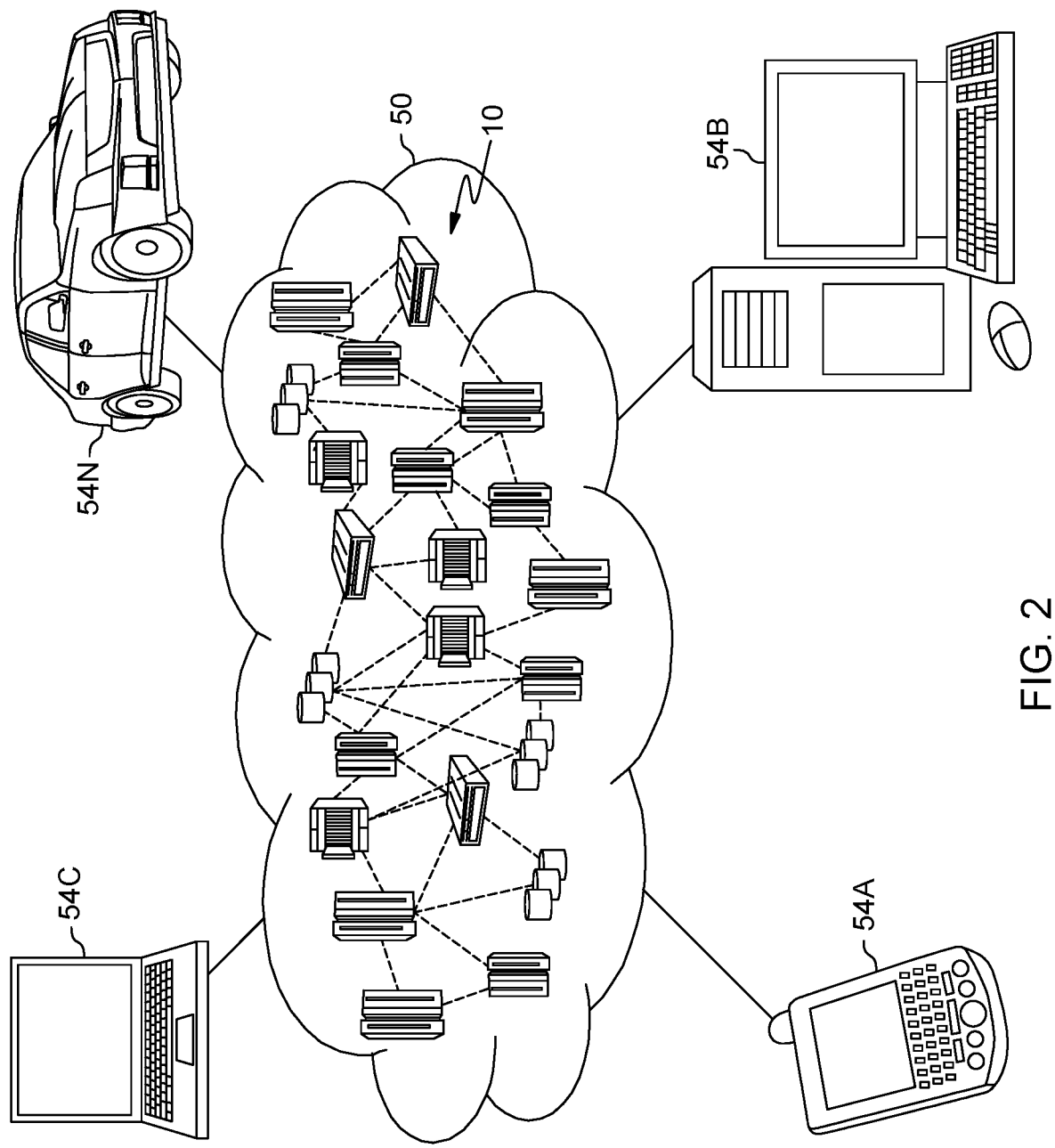
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another and may share resources among one another via edge computing technology. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Edge computing is a distributed computing paradigm that brings computation and data storage closer to the sources of data. This is expected to improve response times and save bandwidth. Edge and IoT (internet of things) are not synonymous in that edge computing is a topology-sensitive and location-sensitive form of distributed computing. The term refers to an computing architecture rather than a specific technology, such as IoT. Multi-access edge computing (MEC) brings technology resources closer to the end device. Data is processed and stored at the network's edge often using shared resources of linked end devices, not at a remote data center, which significantly reduces latency. MEC provides both an IT service environment and cloud computing capabilities to local devices with reduced latency compared to traditional cloud computing environments.

Figure 3:
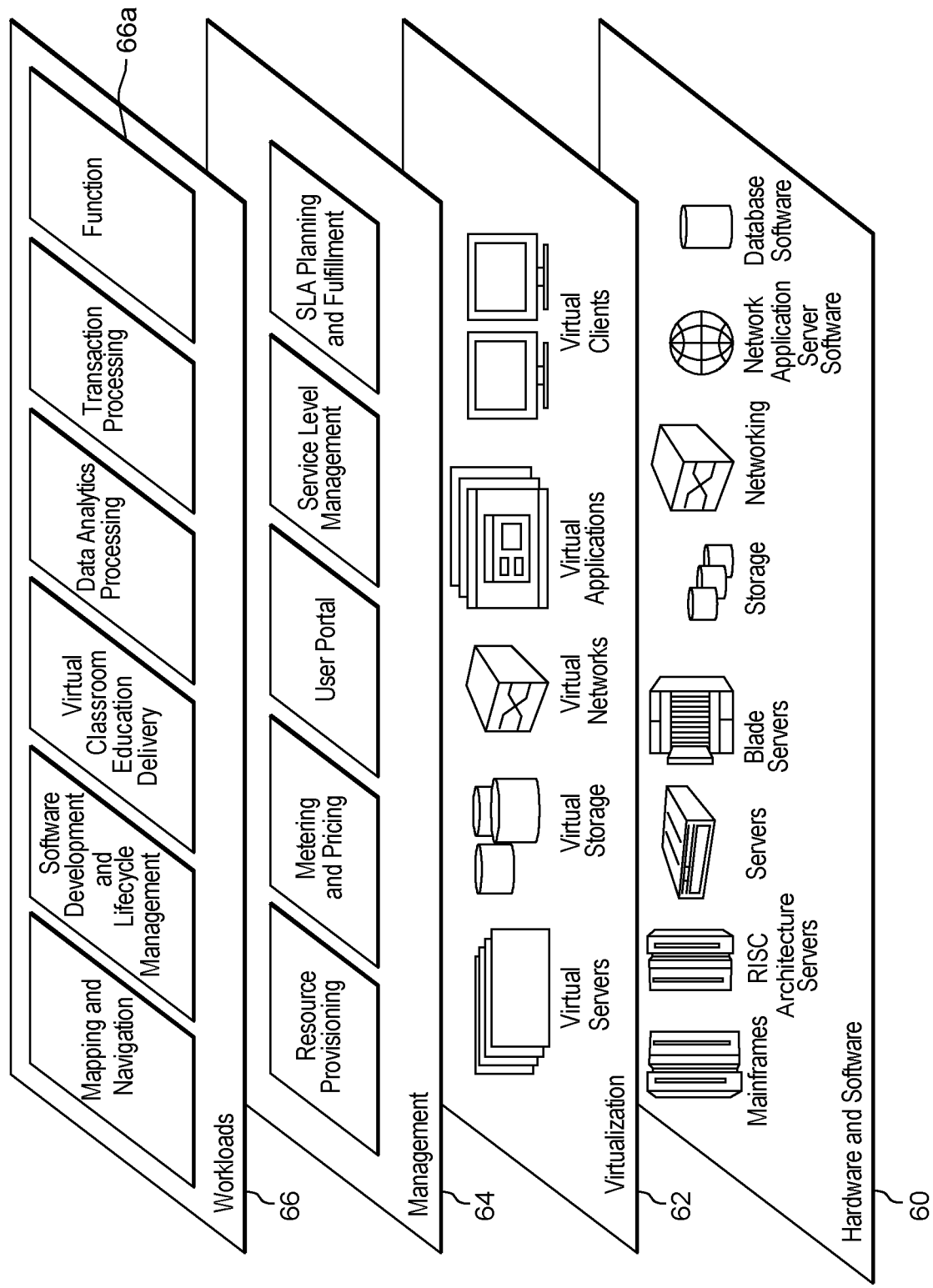
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A conventional edge computing network arrangement produces high latencies and may result in performance bottlenecks as the orchestrator of the conventional system represents a single point of failure. Additionally, the entire system will be paralyzed whenever the internet access is interrupted.

A fully distributed edge computing network strategy is often adopted so that mobile devices individually communicate their state with one another, in order to get an idea about the nature of the resources surrounding them and to find the best offloading location. This technique provides a low latency and there is no risk of bottlenecks. Some embodiments of the present invention recognize that it is difficult to manage fully distributed networks and, further, communicating mobile-device metadata continuously produces high network traffic and increases energy consumption.

Some embodiments of the present invention recognize problems associated with various aspects of edge computing environments with respect to applications requiring low and predictable latency. Some aspects include: (i) the edge computing network; (ii) the queue network for edge computing; (iii) collaboration and offload for edge computing; and (iv) placement of the offloaded task for edge computing.

Without gathering the proper information on the task-arrival time, data packet sizes, and task rate for queues, edge devices face some challenges in a dynamic and rapidly changing environment to determine where the offloaded task will be processed. Without collaboration among the resources of an edge computing device, the resources are wasted or sometimes overloaded with different service requests and applications. The lack of collaboration increases the task failure rate and task duration of the edge computing device. The edge computing system dynamics are difficult to measure or model and the state transition probability matrix is normally intractable to obtain, especially when the state and action spaces are large. The distinct MEC (multi-access edge computing) server has faced some challenges to determine where the offloaded task will be processed because the system struggles to predict the demand of edge computing in advance. As a result, the quality-of-service (QoS) is deteriorated by service interruptions, long execution, and extended waiting times.

A smart traffic signal controller (TSC) operates at various control states including, for example: (i) shutdown state; (ii) traffic signal pre-timed control; (iii) adaptive signal control; (iv) emergency vehicle signal preemption control; and (v) transit signal priority control. During operation, the smart TSC may operate from a system boot to a default operation state of pre-timed light control with monitoring of traffic for exceptions to the default operations. Exceptions include moments with buses or emergency vehicles approach the traffic signal. The adaptive control state may be operational when certain vehicles are identified within current traffic conditions. When insufficient information is available to identify a vehicle of interest, such as a bus or ambulance, control reverts back to the default pre-timed signal control.

The exhibited heterogeneity of workload characteristics such as task scale, execution time, and resource usage patterns have raised new segment scheduling challenges in terms of performance interference, resource utilization, power consumption, and system resilience in traffic signal control.

Modern traffic lights, also referred to herein as traffic signals, are intelligent. Once the traffic lights are set up, there are automatic configuration adjustments made to the signals according to the road network. The traffic light camera supports determining the number of pedestrians, warning pedestrians, sensor monitoring of automobile traffic. In some case, the traffic lights are stand-alone smart utilities deployed in a smart city. With the increasing traffic congestion and the rapid changes of traffic demands, the requirements for short production cycle, low cost, and high personalization have become serious challenges for traffic signal control systems (TSCS). Conventional self-orchestration negotiation models lead to unbalanced equipment workload, especially in mixed traffic applications. Multi-type tasks are not handled in consistent manner across edge devices. Energy consumption and workload levels vary greatly among edge devices (i.e. traffic lights).

Conventional reinforcement learning methods simulate state changes through tables. When the number of states is too large, it is hard to traverse each state resulting in failures of the algorithm.

Some embodiments of the present invention are directed to a spatial network community that is dynamically based on edge device attributes and geographic awareness.

Some embodiments of the present invention are directed to edge device computing self-orchestration including implementation of a network of task queues as edge-device environmental information for use by a capacity estimator and task placer. The capacity estimator enhanced with a method to improve efficiency and precision of the online policy gradient training algorithm. The task placer enhanced by a reactive distributed request for help method.

Some embodiments of the present invention are directed to improving efficiency and precision of an online policy gradient training algorithm, accelerating decision-making, and reducing data processing latency with an online deep policy gradient training algorithm based on importance sampling and DRL-based off-loading scheduling.

Some embodiments of the present invention are directed to increasing the utilization rate of edge devices in a spatial network community with a reactive distributed request for help method.

Some embodiments of the present invention are directed to a network of task queues as edge-device environmental information for capacity estimation and task placement to shorten response time for edge tasks and improve customer experiences.

Some embodiments of the present invention are directed to a smart traffic signal control system (TSCS). An integrated RSU (Roadside Unit) for smart traffic signal control system is designed and implemented to support multi-modal V2X-based applications including emergency vehicle signal preemption, transit signal priority system, adaptive traffic signal control, and pre-time signal control, eco-driving supporting, road work, and incident alarm message broadcasting. The features of the smart TSCS are the integration of multi-modal applications, modular design, real-time traffic control algorithms, and traffic data collection. The smart TSCS is designed by a unified system architecture with an RSU middleware which organized by modular functional design. Moreover, it is backward compatible with traditional traffic signal controller so that these applications can be fast and cost efficiently deployed without replacing legacy infrastructure.

Figure 4:
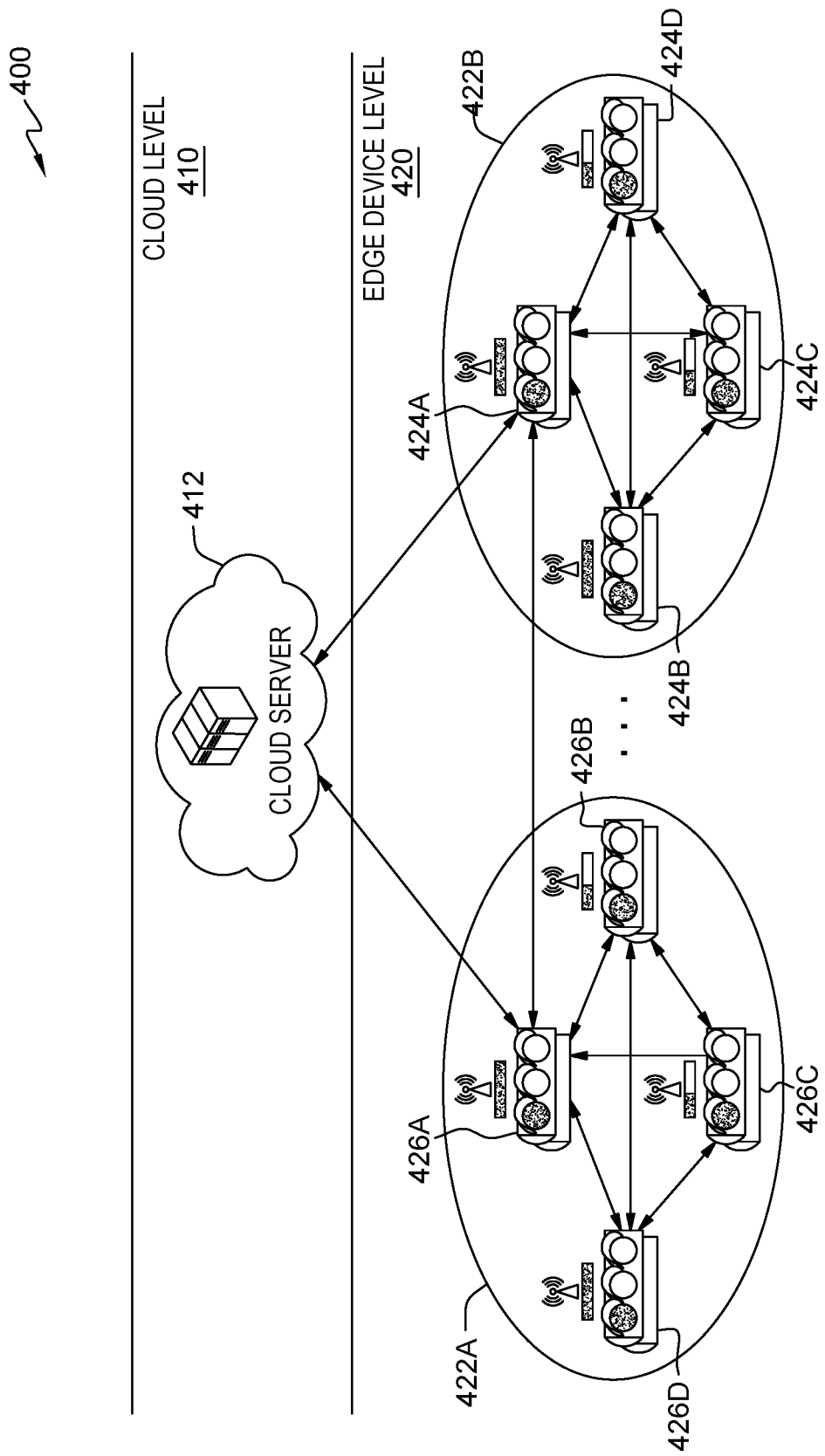
FIG. 4 depicts an edge device level of the first embodiment system according to the present invention.

FIG. 4 illustrates smart traffic signal control system 400 including cloud level 410 components and edge device level 420 components. The cloud level includes cloud server 412 operating at least in part in a manner described above with respect to cloud computing environments. The edge device level includes traffic signal clusters 422A, 422B. Each cluster includes smart traffic signals, or traffic lights. Cluster 422A includes smart traffic signals 426A, 426B, 426C, and 426D. Cluster 422B includes smart traffic signals 424A, 424B, 424C, 424D.

Figure 5:
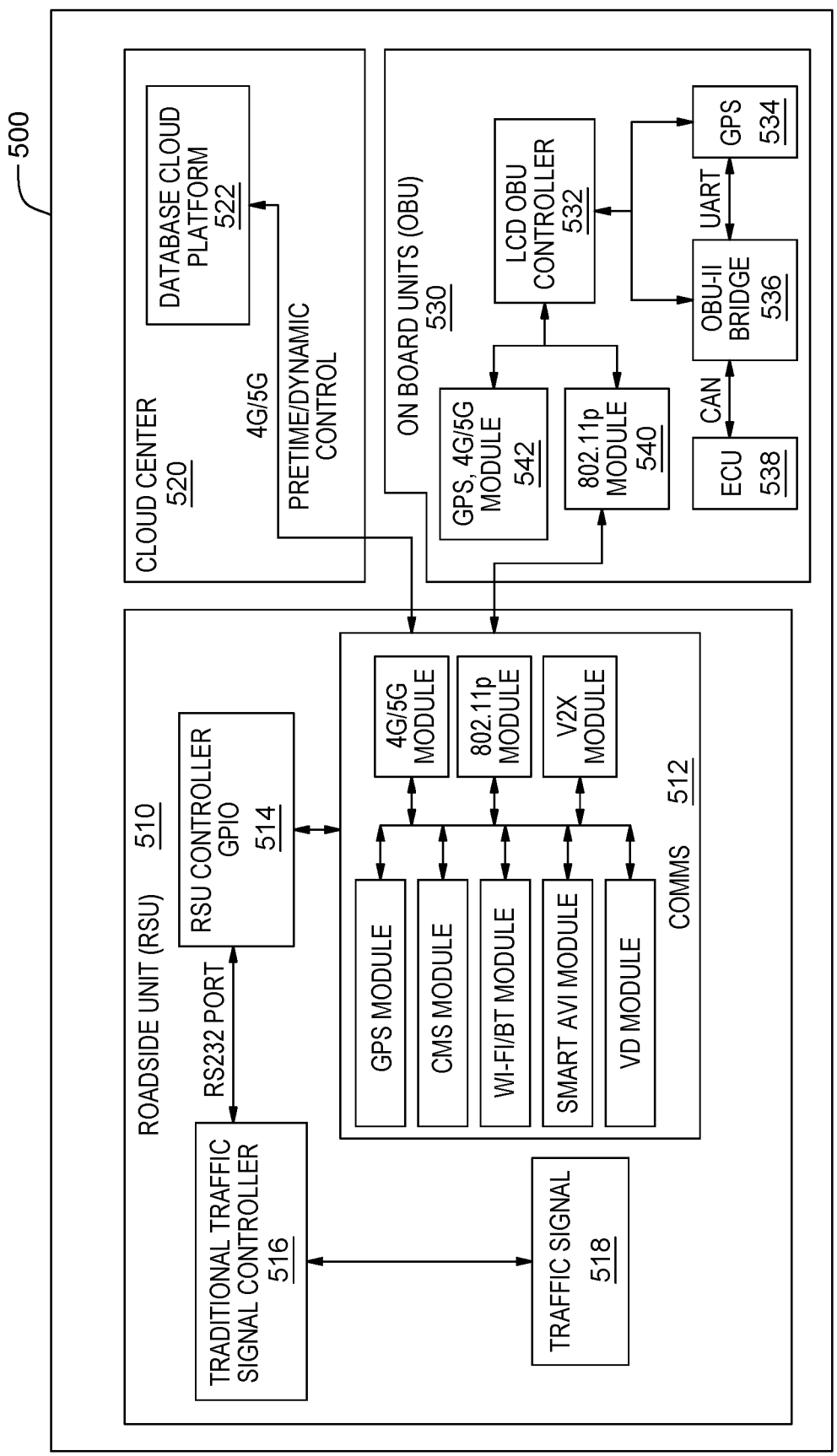
FIG. 5 depicts a schematic view of a machine logic (for example, software) portion of an edge device in the first embodiment system according to the present invention.

Example system architecture 500 for a traffic signal is shown in FIG. 5. Three subsystems operate with the traffic signal including RSU (Roadside Unit) 510, OBU (On-board unit) 530, and cloud center 520. RSU controller 514 is connected to traditional traffic signal controller 516 and traffic light 518. It is implemented by an industrial computer designed by modularization concept where multiple external modules can be flexibly added onto the RSU by the general purpose input/output (GPIO) interface. The supporting peripheral modules of communications unit 512 include: 802.11p module, V2X interface module, GPS module, changeable message sign (CMS) module, mobile communication (4G/5G) module, and Wi-Fi/BT module. In addition, the RSU 510 include additional GPIO for real-time traffic information extension, including loop detector or video traffic analyzer (smart AVI module) and VD module.

On-board Unit 530 includes vehicle operational software for communicating with roadside unit 510 such as: wireless 802.11p module 540; GPS 4G/5G module 542; on-board unit controller and LCD display 532 in communication with electronic control unit 538; OBU-II bridge module 536, and local GPS navigation module 534. The cloud center 520 communicates with RSU 510 via 4G/5G communication channel for pre-timed/dynamic controls with cloud platform and database set 522.

Architecture 500 supports process steps including: (i) measuring the distance and speed of approaching vehicles from every direction and coordinate the green traffic wave by interacting with neighboring signals; (ii) detecting the presence of pedestrians and cyclists crossing the street; (iii) issuing "slow down" warnings to vehicles at risk to crossing in red and modify individual light cycle to prevent collisions; (iv) processing collected data to perform real-time analytics to support, for example, changing the timing of the light cycles in response to the traffic conditions; and (v) sending the data collected from traffic signal clusters to the cloud for global, long-term analytics. The global nature of operations (ii) and (iii) contrast with the localized objective of operation (i). There is a wide difference in timescales from one item to the next. Item (i) requires real-time reaction, (ii) requires near-real time, and (iii) relates to the collection and analysis of global data over long periods of time.

Figure 6:
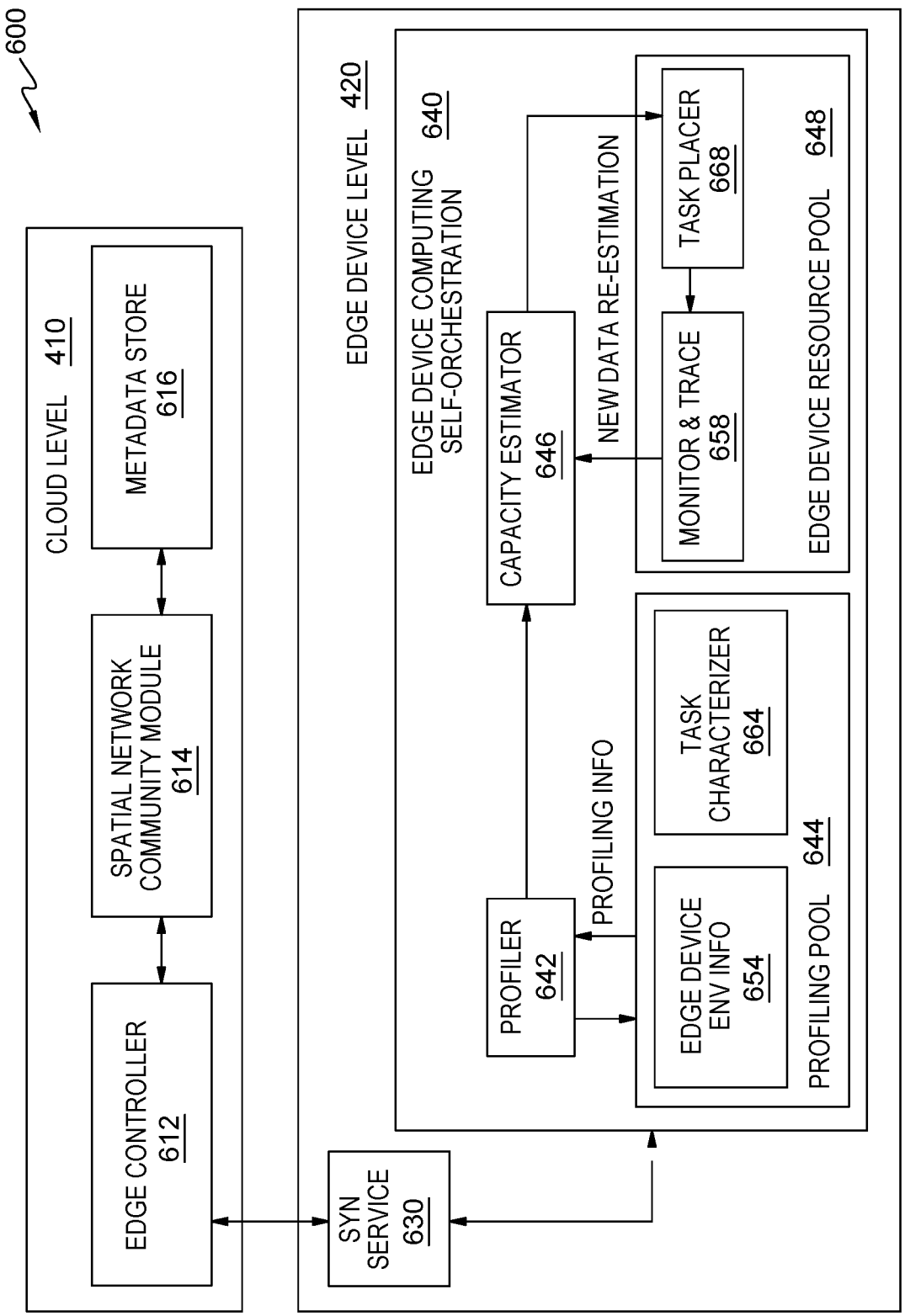
FIG. 6 depicts a schematic view of the first embodiment system according to the present invention.

FIG. 6 shows how spatial network community module 614 may be incorporated into traffic signal control system (TSCS) 600. At the cloud level 410, traffic signal metadata store 616 maintains traffic signal information, including geographic location information, for generating a spatial network community of traffic signals according to spatial network community module 614. Finally, edge controller 612 communicates with synchronization service 630 at the edge device level 420.

At the edge device level, the edge device computing self-orchestration sub-system 640 operates to evaluate the traffic signals based on clusters of networked communities. Sub-system 640 includes: profiler module 642; profile pool 644; edge device environmental information module 654; task characterizer module 664; capacity estimator module 646; edge device resource pool 648; monitor and trace module 658; and task placer module 668.

Figure 7:
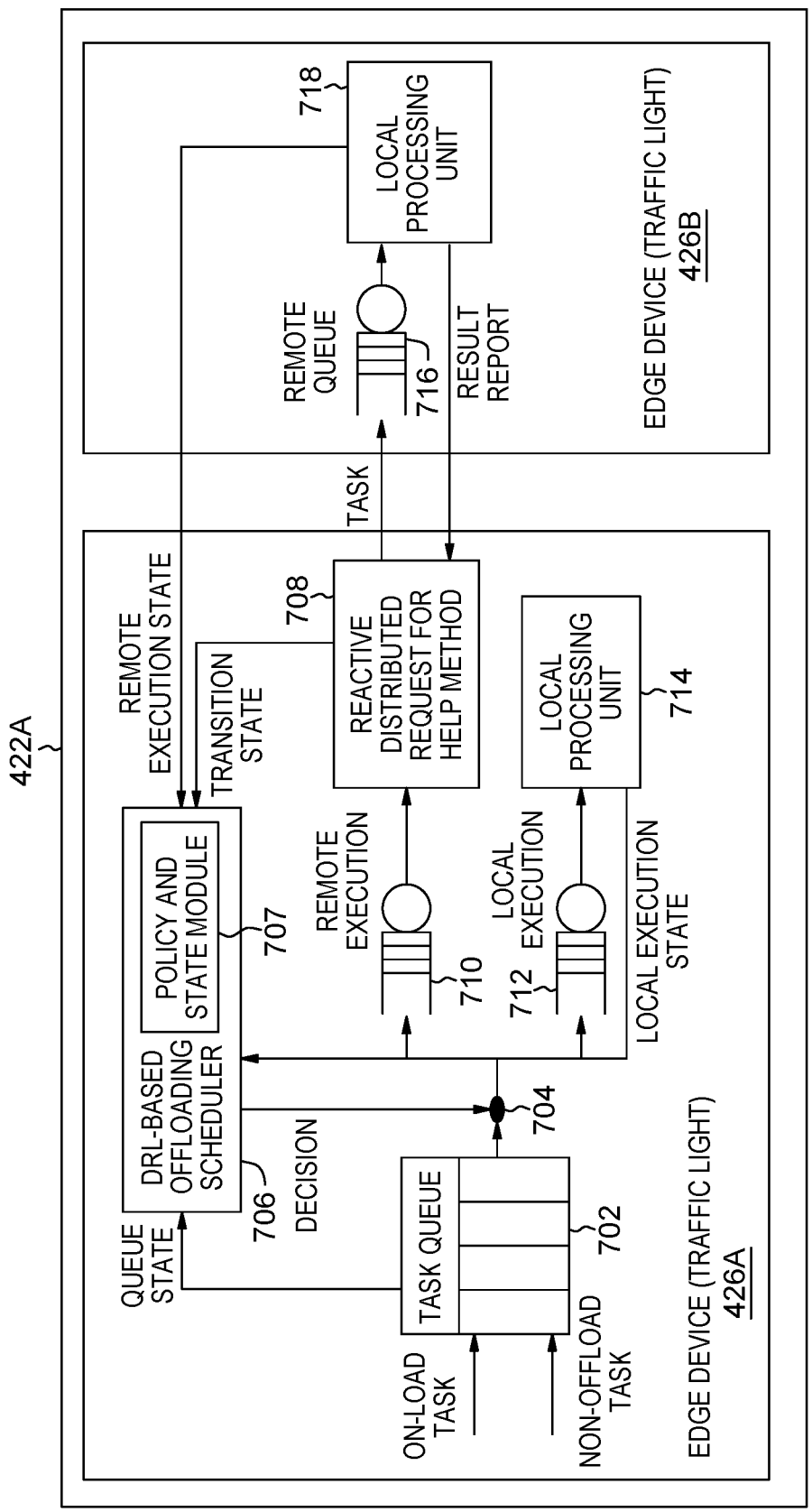
FIG. 7 depicts a schematic view of a cluster of edge devices in the first embodiment system according to the present invention.

FIG. 7 shows a leader edge device in communication with a participant edge device within an operational cluster of edge devices grouped according to a spatial network community method. In this example, leader traffic light 426A includes: task queue 702, 710, 712; task node 704; deep-reinforcement-learning-based offloading scheduler module 706; policy and state module 707; reactive distributed request for help module 708; and local processing unit 714. Participant traffic light 426B includes: remote task queue 716 and local processing unit 718. In this example, the leader traffic light has the task to be completed and may offload its task to another participant traffic light to complete the task depending on certain parameters under consideration.

Since the location of the traffic signal plays an important role in traffic signal control systems (TSCS), there is a need for modeling the relevant geographic area and the location of traffic signals within the geographic area, which maybe denoted as the traffic signal community. Currently, TSCS sub-area divisions are executed according to dynamic traffic counts and link length between street intersections, which largely relies on the experience of traffic engineers. Based on inherent characteristics of traffic network topology, the spatial network community method can show more reasonable evidence for TSCS sub-area divisions.

Some embodiments of the present invention are directed to a method for a spatial network community in a TSCS, the method including: (i) dividing the TSCS diagram into N communities with each traffic light representing one community. The initial $E_{ij}$ and the sum $\alpha_i$ of its rows of matrix E satisfy the following relationship:

$$\alpha_i = \frac{k_i}{2m}$$

$$E_{ij} = \begin{cases} \frac{1}{2m} \\ 0, \end{cases}$$

if there exists link between i and j otherwise,
where $k_i$ is the degree of edge device i and m is the total number of links in the network; (ii) merge the communities that contain links and record the increment of the network module degree:

$$\Delta Q = 2(E_{ij} - \alpha_i \alpha_j),$$

where merging should be executed along the direction that can make $\Delta Q$ move toward maximum values and then renew $E_{ij}$ and add the ranks and rows related to the community i and j; (iii) repeat step ii until the whole network merges into one community; and (iv) consider the dendrogram of the community structure and select the max module degree to determine the optimal division of spatial network community.

Edge device computing self-orchestration 640 supports resource-hungry tail-end behavior applications with low latency and high energy efficiency and solves an important computation offloading scheduling problem in traffic control systems. In principle, the system schedules tasks waiting in a queue in order to minimize the long-term costs of performance in terms of a trade-off between task latency and energy consumption. Due to diverse task characteristics, a dynamic wireless environment, and frequent handover events caused by traffic signals, the optimal solution should take into account both where to schedule the task (i.e., local computation or offloading to remote resource) and when to schedule each task with regard to, for example, the order, or sequence, of operations of the task and the time at which the task execution should occur).

Edge device information module 654 and task characterizer 664 operate to identify characteristics of the incoming tasks 704 from the task queue 702. Capacity estimator 646 estimates the available capacity of the neighboring edge devices. Both components are used by task placer 668 to determine on which edge device the task should be executed. Based on the received tasks, each edge device stores load information to be used by the self-orchestrator 640. Edge orchestration takes place each time a task (or a configurable batch of tasks to be considered together) is submitted to an edge device.

To provide an efficient solution for task assignment, an iterative greedy approach is adopted for assigning tasks to traffic lights within a particular cluster. Three basic concepts drive the approach: (i) maximizing the efficiency of utilizing the communication channel, tasks with higher computational requirement are prioritized to increase the efficiency of using the traffic lights because it increases the probability of keeping edge device CPUs (central processing units) busy with tasks that require relatively higher compute power while buffering new tasks at the traffic signal controller; (ii) maximizing the useful computation and increase processor utilization, the task is assigned to the traffic light that enables getting its results earlier; and (iii) maximizing the number of tasks executed by a given traffic light, the traffic signal controller assigns as many tasks as possible to a given traffic light before a results-gathering event is triggered by results-gathering heuristics.

The queued tasks are assigned to three categories depending on their deadline requirements. Those categories are derived from three traffic-light classes: (i) delay-sensitive (DS) tasks; (ii) delay-constrained (DC) tasks; and (iii) delay-tolerant (DT) tasks. In this example, the profiler module 642 operates to provide efficient task assignment using an interactive greedy algorithm to assign tasks to traffic signals within the edge device level of the smart TSCS by classifying tasks as one of DS, DC, or DT. Alternatively, the queued tasks are assigned relevant categories according to application-specific requirements, such as environmental monitoring networks where local geological features may dictate the delay-sensitivity of the certain tasks to be performed.

It should be noted herein that tasks in the delay-sensitive category need to be executed on a traffic light, or other edge device, located in the same series of lights as the end device in order to avoid communication link delays. Further, tasks in the delay-constrained category need to be executed on local traffic lights, but not necessarily a traffic light in the same segment as the end device. Finally, tasks in the delay-tolerance category can be executed on traffic lights in the spatial network community of traffic lights or even on a cloud-server-based device. Accordingly, the task category is one factor of the environment of deep reinforcement learning; each task represents a factor of the environmental status.

Task characterizer module 664 leverages available information to build and maintain an edge device profile. In this example, the task characterizer relies upon sensors of the traffic light, user input, and traffic light utilization history to build and maintain each traffic light profile. According to some embodiments of the present invention, the task characterizer gathers data about each traffic light to identify preferences and behavior in certain identified scenarios for use in determining current or future actions and workload. This process operates to opportunistically mines the gathered data and build a profile.

A network of queues is defined as an open network. The network states that the arrival rate for a queue $\alpha \in \{1, \ldots, k\}$ is given by the equation that follows. The incoming and outgoing task rates of all the queues in a spatial network community may be calculated based on the following equation:

$$\lambda_a = \gamma_a + \sum_{b=1}^{k} p_{ba} \lambda_b$$

Where, $\lambda_a$ is the rate of arrival of external targets; $\lambda_b$ is the arrival rate at queue b; and $p_{ba}$ is the probability that a job only moves from queue b to queue a.

Referring now to FIG. 7, the computing architecture 422A of edge device 426A consists of the following: (A) three task queues including task 704: (i) incoming task queue 702; (ii) remote execution queue (REQ) 710; and (iii) local execution queue (LEQ) and (B) a DRL-Based Offloading Scheduler. Modeling the traffic system's workload as a Poisson process is achieved with rate $\lambda$, indicating the expected number of computation tasks arriving in task queue in each time slot. Q[t](j) is the jth (sorted) task waiting in the task queue at a particular time slot t, and the integer index j is upper-bounded by Q, which is described as a 3-tuple, or triple:

$$Q[t](j) \triangleq (t_j^g, d_j, k_j),$$

where $t_j^g$ is the time that $J_i$ is generated, $d_j$ (in bit) is the size of the task input data, and $k_j$ (in CPU cycle/bit) is its CVR, which can be obtained by applying program profilers.

Any task 704 in the task queue 702 is sent to the remote execution queue 710 or the local execution queue 712 by scheduler 706, subsequent tasks are shifted forward to fill the empty position. The variable Q denotes the maximum number of tasks the task queue 702 can hold. Using the expression g[t](q[t]≤Q) denotes the actual number of tasks 704 in task queue 702 at time slot.

The state of the task queue at any time slot t can be represented by a Q×3 matrix Q [t], in which the jth (j∈{1, 2, . . . , q[t]}) row is formed by the three defining elements of the jth waiting task (denoted by Q[t](j) ), i.e., task generation time, input data size, and CVR, respectively. Edge device 426A includes local processing unit 714 including a CPU, a memory, and a camera. This configuration is true for all edge devices in cluster 422A, such as edge device 426B and local processing unit 718, and other clusters of smart traffic signal control system 400. Using M/M/1 queues to model behavior of each of these components where the M/M/1 has a first-come first-serve (FCFS) scheduling discipline, an arrival process that is Poisson and service time that is exponentially distributed exponential distribution. Regarding communications, the WiFi/physical link is modeled using one M/M/1 queue with the receive rate $\mu_i WF$ $\mu_i WR$). For remote execution, the remote task is modeled using one M/M/1 queue with the send/receive rate ($\mu_i WF$ $\mu_i WS$). For local execution, the local task is modeled using one M/M/1 queue with the send rate ($\mu_i CPUI$). In that way, each edge device can be defined as a tuple $$\{\lambda_i, \lambda_{i0}, \mu_i WR \mu_i WS \mu_i WF \mu_i CPUI\}$$

where, $\lambda_i$ is the rate of on loadable tasks, $\lambda_{i0}$ is the rate of non-off loadable tasks, $\mu_i$CPU| is the service rate of CPU, $\mu_i$WF is the WiFi transmission rate. The expression $\mu_i$WS is the rate of off-loadable tasks. Define this edge device information as edge device state information (EDSI).

Data is continually generated during operation of the TSCS 400. Edge device computing self-orchestration subsystem 420 needs to be frequently updated in order to cater the accuracy demands. Especially in the frequently changing scenarios of traffic control. To mitigate the overhead, online learning can be further exploited to autonomously enable capacity estimator 646 to be well-suited for environments that change dynamically and even unexpectedly. Learning techniques such as deep reinforcement learning (DRL) aim to predict and evaluate the effectiveness of a series of steps that need long-term decision support. DRL can tolerate the temporal (e.g., one-step) reward or penalty so long as the long-term reward can be targeted. DRL-based offloading scheduler 706 applies deep reinforcement learning to operations of the smart traffic light, or other edge device, to schedule tasks in task queue 702 for local or remote execution. The individual traffic signal can be seen as a computing environment where various applications are running at the edge device. The runtime status of active traffic signal resources and the ongoing tasks received and/or performed are monitored and collected as the observable states of the traffic signal. The policy and state module 707 of DRL-based scheduler 706 acts as the agent that interacts with the traffic signal environment by taking actions according to the built-in policy. The built-in policy is a specific scheduling approach for taking output actions including resource assignment and process operators. In that way, the dynamic changes of states are accommodated in each subsequent time frame.

To apply DRL to the self-orchestration of the traffic signals having network of individual task queues, there must first be a formulation of a Markov decision process (MDP). The MDP must adequately describe the offloading scheduling process so that DRL techniques may determine the policy for the MDP. Each element of the MDP is discussed below.

Regarding state space:

$$S \triangleq s|s = \{(Q, s(\text{task queue}), s(LEQ), s(REQ), s(\text{Transmission State}))\}$$

at each time slot t, Q is a Q×3 matrix, the jth row of which clarifies the task generation time, input data size, and CVR (computation-to-volume ratio) of the task Q[t]{j}.

When the state function for local execution S(LEQ) reaches zero, the local execution queue is said to be idle and is able to host a new task.

$$S(LEQ)[t] = \max\{s(LEQ)[t-1] - f1, 0\}, t > t1$$

$f1$: CPU cycle

Similarly, when s(Transmission State) reaches zero, the offloading execution queue is said to be idle and is able to host a new task.

$$s(\text{Transmission State})[t] = \max\{s(\text{Transmission State})[t-1] - r[t-1], 0\}, t > t2$$

$r[t]$: bits data for offloading.

Regarding the action space, local execution (LE) action is used to conduct the "where to schedule" operation. These types of actions schedule tasks waiting in the local execution queue 712 to the local processing unit (LPU) 714. The expression $L\varepsilon \triangleq \{LE_1, LE_2, \ldots, LE_Q\}$ applies where $LE_i(i \in \{1, 2, \ldots, Q\})$ is dedicated to the ith task in the local execution queue. Further, remote execution (RE) action is used to conduct the "where to schedule" operation. When reactive distributed request for help (RDRH) module 708 is idle and the remote execution queue 710 is not empty, an RE action can be taken to offload the specified task to remote queue 716 for remote execution at edge device 426B. The expression $R\varepsilon \triangleq \{RE_1, RE_2, \ldots, RE_Q\}$ applies where $RE_j(j \in \{1, 2, \ldots, Q\})$ is dedicated to the jth task in the remote execution queue.

Finally, the holding-on (HO) action may carry out the "when to schedule" operation. The HO actions are responsible for postponing task scheduling. The expression $H\vartheta \triangleq \{HO_1, HO_2, \ldots, HO_W\}$ applies where $HO_w(w \in N+)$ means that the scheduler 706 determines to keep all waiting tasks 704 to stay in the task queue 702 for w time slots, even though the local processing unit and/or RDRH are capable of accepting the computation task.

With the three types of actions defined above, LE action, RE action, and HO action, the complete action space of the MDP, A, is defined as the union of the three sets $L\varepsilon$, $R\varepsilon$, and $H\vartheta$. Thus, $$A \triangleq L\varepsilon \cup R\varepsilon \cup H\vartheta$$

for each system state $s \in S$, the set of actions that the scheduler can take, A(s), may be only a subset of S. For purposes of this disclosure, the actions included in A(s) are referred to as allowed actions for state S. and the remaining actions in A, those included in the complement set of A(s), are referred to as dis-allowed actions.

The policy-based DRL offloading schedule module 706 uses deep neural networks (DNNs) to approximate the parameterized policy, referred to as the policy network. The scheduler module 706 computes an estimator of the policy gradient. The most commonly used gradient estimator has the form:

$$\nabla L^{PG}(\theta) = E_n[\nabla_\theta \log \pi(a_n | s_n; \theta) \hat{A}_n],$$

where $\pi$ is a stochastic policy and $\hat{A}_n$ is an estimator function at time-step n.

Some embodiments of the present invention apply a rewards approach for implementing the scheduling policy. For example, the total time delay (in slot) of all the tasks in an edge device at time slot t is denoted as:

$$\Delta_l^s(t) = q[t] + L\{LE > 0\} + L\{RE > 0\}.$$

The total time delay of all the tasks in the edge computing environment from state Sn to Sn+1 after taking action and can be calculated by:

$$\Delta_l(s_n, a_n, s_{n+1}) = \sum_{t=t_n^a}^{t_{n+1}^a - 1} \Delta_l^s(t).$$

The overall cost brought by action $a_n$ can be considered as a weighted sum of $\Delta_l(s_n, a_n, s_{n+1})$:

$$\text{cost}(s_n, a_n, s_{n+1}) \triangleq \alpha \Delta_l(s_n, a_n, s_{n+1}).$$

The weighting parameter a can be properly chosen to reflect the task preference towards smaller delay or lower computing usage in the offloading scheduling policy design. Accordingly, the reward function $R(s_n, a_n, s_{n+1})$ is defined as the negative of the cost function:

$$R(s_n, a_n, s_{n+1}) \triangleq -k_s^* \text{cost}(s_n, a_n, s_{n+1}),$$

where the constant parameter $k_s$ is chosen to weight the value range of the reward. Starting from an initial state $s_m \in S$, the scheduler can interact with the environment following a specific stochastic offloading scheduling policy, $\pi((a_n | s_n)$. The accumulated reward can be written as:

$$G_m = \sum_{n=0}^{\infty} \gamma^n R(s_{m+n}, a_{m+n}, s_{m+n+1}), s_m \in S.$$

Figure 8:
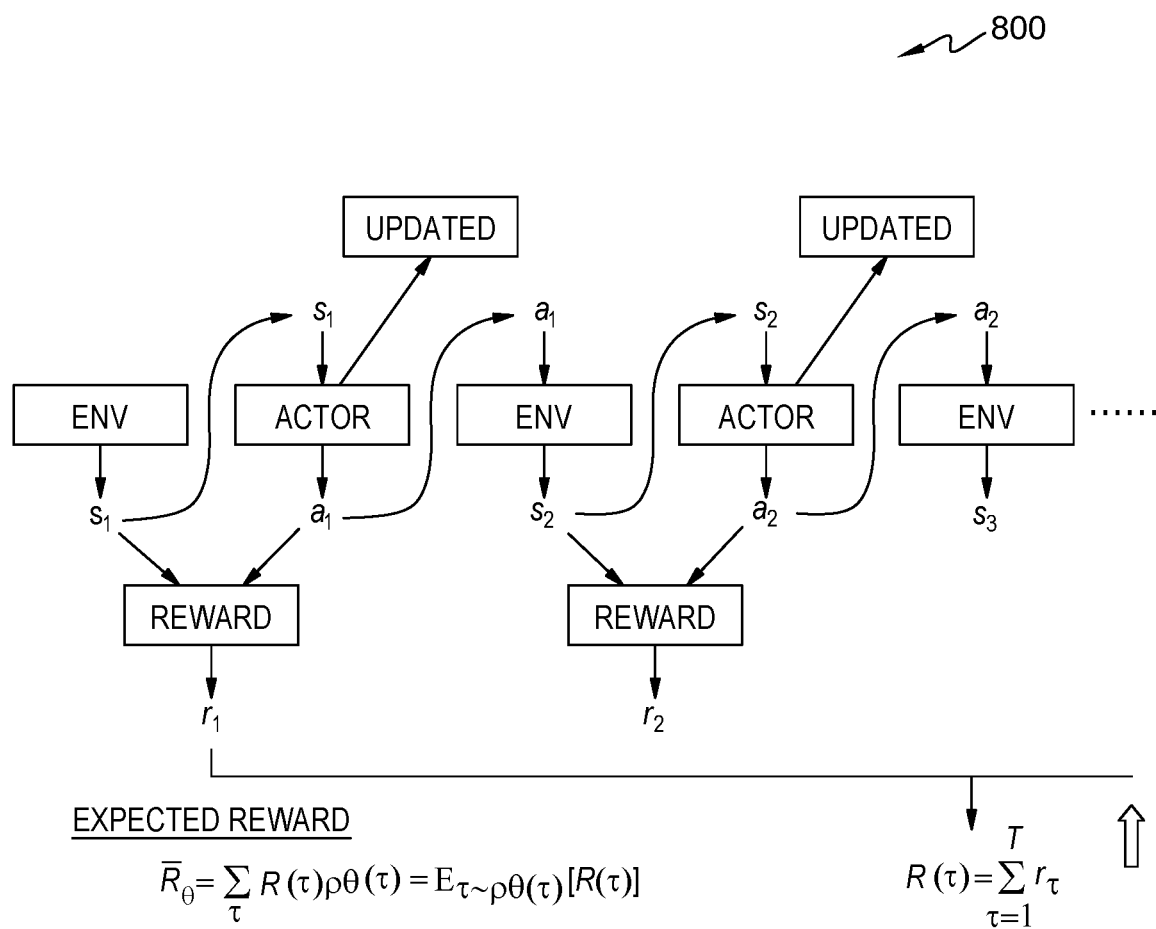
FIG. 8 is a diagram view showing information that is helpful in understanding embodiments of the present invention.
Figure 9:
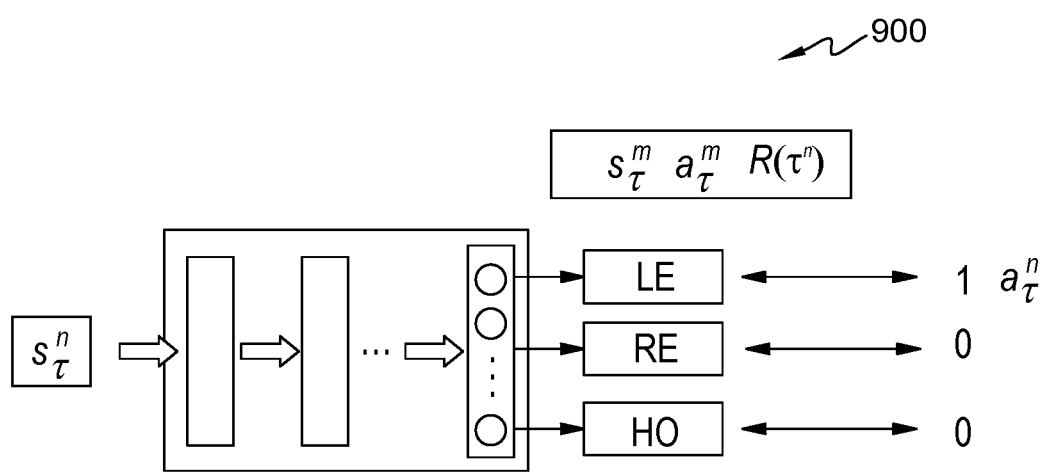
FIG. 9 is a diagram view showing information that is helpful in understanding embodiments of the present invention.

In order to derive a strategy that maps an input state to an output action, a policy gradient method is adopted. The strategy 800 is represented in FIG. 8 using a neural network reference. The input state is as follows:

$$\theta \leftarrow \theta + n \nabla \overline{R_\theta}$$

$$\nabla \overline{R_\theta} = \frac{1}{N} \sum_{n=1}^{N} \sum_{t=1}^{T_n} R(\tau^n) \nabla \log p_\theta(a_t^n | s_t^n),$$

and its output is a probability distribution of all actions. The network is trained in an episodic setting. The episodic will not terminate until all tasks are completed. See FIG. 9 for example classification problem 900.

The on-line deep policy gradient algorithm is a strong learning algorithm with a limitation that is addressed by some embodiments of the present invention. The on-line deep policy gradient algorithm can only learn in one round. When the new data changes, the effect is not good, the revised data must be re-learned. Re-irrigation is required to retrain the original number and parameters to make an approximation, the new data and the old data have a deviation. Local execution also uses the old data, pushes to the idle resources to use the new data calculation, and updates the model accordingly. This approach resolves the on-line policy gradient accuracy issue.

Conventional on-line policy gradient practice collects data but when a parameter is updated, training data must be sampled again. Some embodiments of the present invention use the original sample training data, fixing a key parameter so the sample data can be reused as follows:

$$\nabla \overline{R_\theta} = E_{\tau \sim p_{\theta'}(\tau)} \left[ \frac{p_\theta(\tau)}{p_{\theta'}(\tau)} R(\tau) \nabla \log p_\theta(\tau) \right].$$

Figure 10:
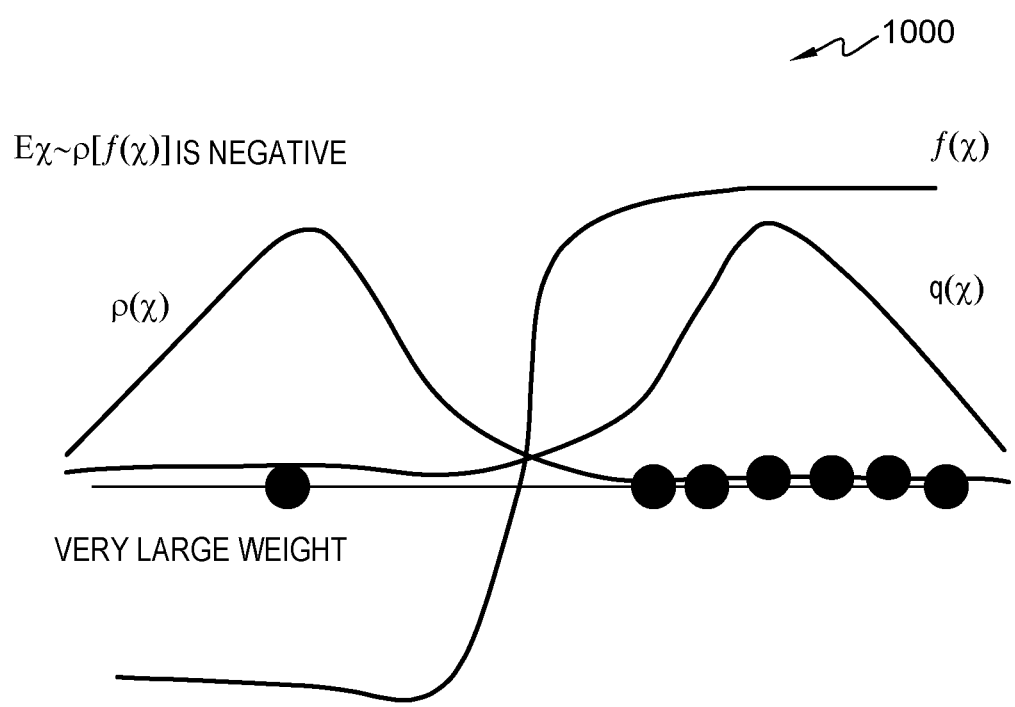
FIG. 10 is a graph view showing information that is helpful in understanding embodiments of the present invention.

Referring now to FIG. 10, the issue of importance sampling is illustrated with graph 1000 related to the equation $$E_{x \sim p}[f(x)] = E_{x \sim q}\left[ f(x) \frac{p(x)}{q(x)} \right].$$

The parameter-shared DNN architecture is adopted by embodiments of the present invention with the overall objective being drawn from a combination of (i) the local DRL network based on on-line deep policy gradient algorithm with importance sampling; and (ii) remote DRL network based on DRL-based off-loading scheduling.

On-line deep policy gradient training algorithm based on importance sampling and DRL-based off-loading is described in more detail below. Scheduling is as follows: (i) two DNNs are initialized with the same parameter ($\theta' \leftarrow \theta$), one for Local DRL Network($\pi_{\theta'}$) and the other for remote DRL Network($\pi_\theta$).

In the local DRL stage, the on-line deep policy gradient training algorithm with importance sampling is applied to N trajectories (e.g., (S0, a0, r0, S1, . . . , S_terminal)), which are sampled following the old policy $\pi_{\theta'}$. For training efficiency, the generalized advantage estimations for each time step n in each trajectory Ti, are computed in advance in this stage. In the remote DRL network stage, the parameter $\theta$ of the policy $\eta_\theta$ is updated for K epochs by off-loading DRL, where an epoch is one forward pass and one backward pass of all the training examples. In each epoch, improve the policy $\pi_\theta$ by on-line deep policy gradient training algorithm based on the updated sample data. After the remote DRL network stage, the sampling policy is updated, $\pi_{\theta'}$, with the current $\pi_\theta$, to improve efficiency and precision of the on-line deep policy gradient training algorithm.

Referring again to FIGS. 6 and 7, task placer 668 receives requests from reactive distributed request for help (RDRH) module 708 to support decision-making when a request for help is issued. For example, a spatial network community may be represented by a graph. Letting G=(N,A) be a directed network defined by a set N of n edge devices, and a set A of m directed arcs. For each arc the relevant expression (i,j)∈ A represents a communication link, such as a WiFi connection, from edge device i to j, which has an associated cost $c_{ij}$ that denotes cost per unit flow on that arc.

In this example, edge devices only communicate when they need help, rather than when other device need help. The edge device broadcasts "Request for Help" (RFH) and awaits a response from neighboring edge devices of the spatial network community. The response from edge devices is accomplished by sending device-specific edge device state information (EDSI). Essentially, the RDRH module of a given edge device communicates with immediate-neighbor edge devices to determine availability for offloading a task and then proceeds by making a decision based on the responsive EDSI data. Each edge device in the network is driven to minimize the cost of its own objective function on the basis of the EDSI information of its immediate neighbors. The EDSI information may include one or more of the following rates, which may be used in a tuple, or vector: (i) the rate of loadable tasks, $\lambda_i$; (ii) the rate of non-off-loadable tasks, $\lambda_{i0}$; (iii) the service rate of the CPU, $\mu_i$cpu; (iv) the WiFi transmission rate, $\mu_i$WF; and/or (v) the rate of off-loadable tasks, $\mu_i$WS.

In the following decision vector discussion, the decision variable $x_{ij} \in R^{(n \times m)}$ represents the task flow on a communication link (i, j)∈ A with the decision vector defined as follows:

$$X = \underset{x}{\operatorname{argmin}} \sum_{i=1}^{n} \sum_{j=1}^{n} c_{ij} x_{ij}$$

$$X = \begin{bmatrix} x_{11} & \cdot & x_{1i} & \cdot & x_{1n} \\ \cdot & \cdot & \cdot & \cdot & \cdot \\ x_{i1} & \cdot & x_{ii} & \cdot & x_{in} \\ \cdot & \cdot & \cdot & \cdot & \cdot \\ x_{n1} & \cdot & x_{ni} & \cdot & x_{nn} \end{bmatrix}$$

The variable $x_{ii}$ is the job rate that is executed locally. The equality constraint makes sure that all the tasks are assigned whereas the inequality constraint makes sure that the tasks can be processed by corresponding edge devices they are assigned. It should be noted that this formulation causes the task placer 668 to use edge device state information (EDSI) from all edge devices, n, to make decisions on behalf of all the edge devices simultaneously. The above equation can be rewritten as a decision matrix, below, with each row of X as a decision vector (dv), the $dv_i$ tells edge device i how it should process the incoming targets. Further, it is apparent that the ith column of the matrix indicates how other nodes are offloading to the ith edge device.

subject to $(s.t.) \Sigma_{j=1}^{n} x_{ij} = \gamma_i, \forall_i \in N \Sigma_{j=1}^{n} x_{ji} = \gamma_{i0} \leq \mu_{iCPU}, \forall_i \in N \rightarrow x_{ij} \geq 0$, The cost function may be written as follows:

$$c_{ij} = \begin{cases} \omega_3 L_i, & \text{if } i = j \\ \frac{\omega_1 D(f+1)}{BW_{ij}} + \frac{\omega_2 B_i}{B_j} + \omega_3 L_j, & \text{if } i \neq j, (i,j) \in A \\ \infty, & \text{if } i \neq j, (i,j) \notin A \end{cases}$$

where,
D is the data size;
f is the average retransmission times;
$BW_{ij}$ is the expected bandwidth between node i and j;
$B_i$, $B_j$ are the remaining battery in node i, j;
$L_i$, $L_j$ is the number of tasks already in edge device: i, j; and
$\omega_1$, $\omega_2$, $\omega_3$ are weight factors.

Figure 11:
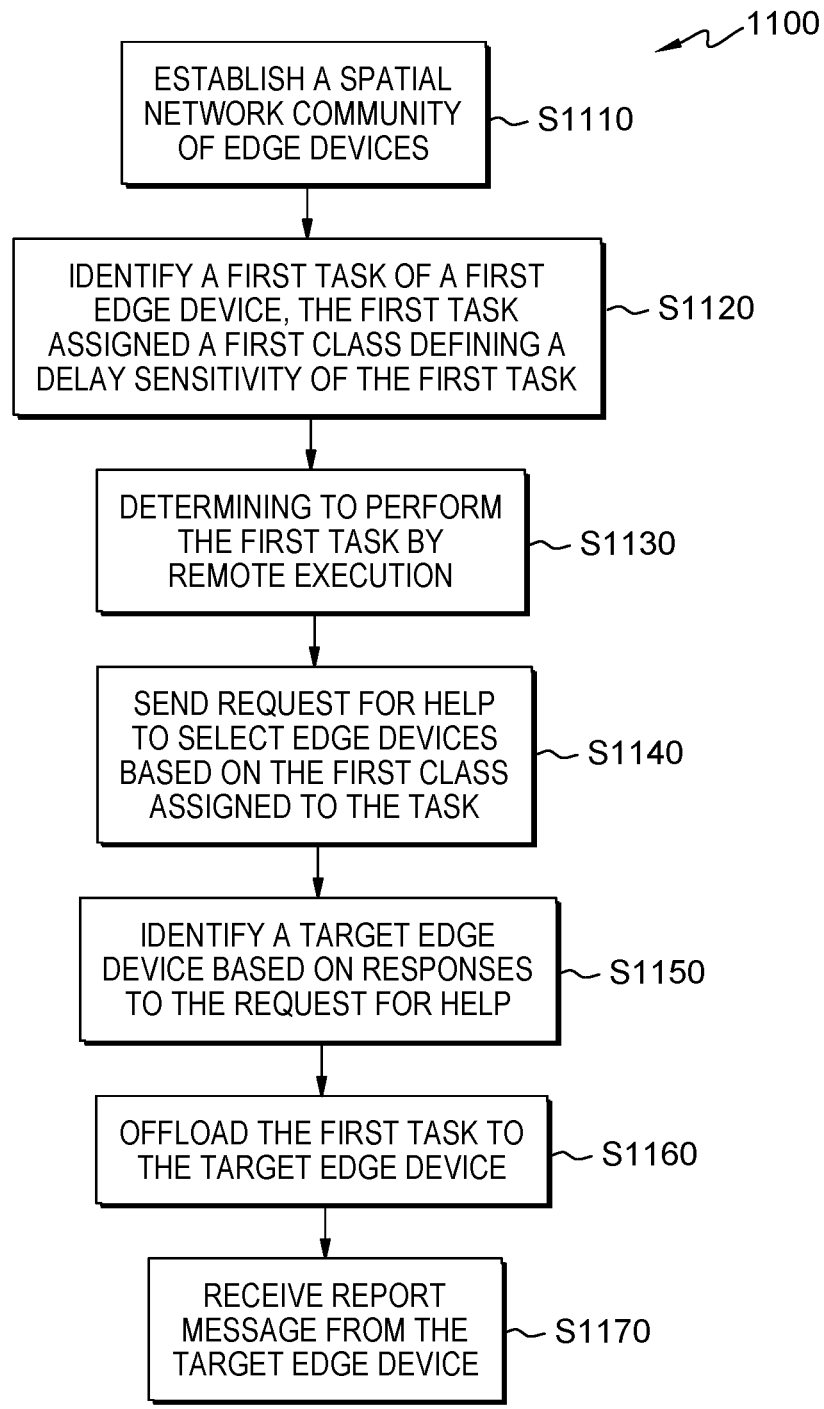
FIG. 11 is a flowchart showing a first embodiment method performed, at least in part, by the first embodiment system.

FIG. 11 shows flowchart 1100 depicting a method according to the present invention. This method and associated software will now be discussed, over the course of the following paragraphs. One physical location where program 1200 of FIG. 12 may be stored is in storage block 60a (see FIG. 3).

Processing begins at operation S1110, where the edge network orchestration system establishes a spatial network community of edge devices. In this example, the spatial network community is dynamically based on individual edge device attributes with geographic awareness. As discussed in more detail herein, individual edge device attributes in which the network (relationship) of devices as a weighted graph where the device (traffic light) corresponds to a node and the connections are links include, as the link weight (properties): (i) the connection type; (ii) network speed; (iii) response time; and/or (iv) connection hardware. In this example, the spatial network community is established by spatial network community module 614 (FIG. 6). Edge network orchestration is handled individually by edge devices having tasks to offload by edge device computing self-orchestration sub-system 420, which may direct operations of multiple edge devices via deep-reinforcement-learning-based offloading scheduler 706 (FIG. 7).

Processing proceeds to operation S1120, where the system identifies a first task of a first edge device, the first task assigned a first class defining a delay sensitivity of the first task. In this example, profiler module 642 operates to profile incoming tasks in conjunction with task characterizer 664 of the profiling pool 644. Each task is assigned a class related to time-sensitivity of the task. In some embodiments, the time sensitivity of a task is predicted according prior training on sample data sets. In other embodiments, the task is flagged when it is particular time-sensitive so that it can be processed more quickly than other tasks, in cases where there are only two categories, or classes, of data: sensitive and not-sensitive.

Processing proceeds to operation S1130, where the system determines to perform the first task by remote execution. The decision whether to perform a given task locally or remotely depends on several factors and is discussed in detail earlier in this description. For purposes of this example, the decision is made to offload the task to another edge device.

Processing proceeds to operation S1140, where the system sends request-for-help signals to select edge devices based on the first class assigned to the task. When it is determined that a particular task will be offloaded, or executed remotely, processing moves to identify which edge devices may perform the task in an appropriate timeframe with reference to the class of task. Upon determining, for example, that the task must be performed by immediately neighboring edge devices such as traffic signals in the same series or at the same intersection, the candidate edge device are sent a request-for-help signal from the edge device needing to offload the task. In this example, reactive distributed request for help module 708 sends the signal out. Responsive signals are returned to policy and state module 707 of the scheduler to select the edge device to perform the task. Responses include edge device state information (EDSI).

Processing proceeds to operation S1150, where the system identifies a target edge device based on responses to the request-for-help signal. Analysis of the responses to the request for help yields a preferred remote edge device, which his identified as preferred according to policy supported by a current sample dataset on which the DRL-based scheduling decision is made. As discussed in detail herein, identifying the target edge device for performing the remote execution is based on an improved online policy gradient training algorithm based on importance sampling.

Processing proceeds to operation S1160, where the system offloads the first task to the target edge device. According to the selection of the target edge device, the first task is offloaded from the first edge device to the target edge device. In this example, the first task is transmitted to remote edge device 426B, populating remote queue 716 for processing via local processing unit 718.

Processing ends at operation S1170, where the system receives a report message from the target edge device. When the task is complete the computations or other result of processing the task is reported back to the requesting edge device. While the example discusses the flow of a single task, in practice many tasks are processed by the edge device with most task being processed locally and some tasks being identified for offloading within the spatial network community for help.

Some embodiments of the present invention are directed to resolving latency problems in spatial-network-community-based edge computing by: having spatial network community dynamically based on edge device attributes and geography-awareness; having edge device computing self-orchestration; using network of task queues as edge device env info for capacity estimator and task placer; having capacity estimator to improve efficiency and precision of task offloading with on-line policy gradient training in deep reinforcement learning algorithm; and having task placer for reactive distributed request for help method.

Some embodiments of the present invention are directed to an edge orchestrator with more than the network, but also with the edge-device-specific CPU, memory, loading, and status.

Some embodiments of the present invention are directed to resolving an edge orchestrator problem by implementation of a capacity estimator module to improve task offloading and a task placer module to participate in a reactive distributed request for help method.

Some embodiments of the present invention are directed to offloading the task to the edge device in a spatial network community rather than selecting the best edge server for offloading and allocating the optimal computational resource.

Some embodiments of the present invention apply deep reinforcement learning to find the best offloading edge device for a particular task.

Some embodiments of the present invention are directed to an edge device environments including the following elements: (i) task queue; (ii) remote execution queue (REQ); (iii) local execution queue (LEQ); (iv) incoming and outgoing task rates in a queue; task categories, and task transmission.

Some embodiments of the present invention may include one, or more, of the following features, characteristics and/or advantages: (i) the spatial network community method is established on edge devices, and then it is used to reduce the bandwidth and latency issues of spatial-network-community-based edge computing; (ii) DRL-based edge device computing self-orchestration is particularly suitable for solving the edge device computing offloading problems in dynamic environments; (iii) improves efficiency and precision of conventional on-line policy gradient training algorithm; (iv) accelerates decision-making; (v) lowers data processing latency by on-line deep policy gradient training algorithm based on importance sampling and DRL-based off-loading schedules; (vi) increases the utilization rate of edge devices in spatial network community by reactive distributed with request for help method; and (vii) a network of task queues as edge device environmental information for capacity estimator and task placer is used to shorten response time for edge tasks and improve customer experiences.

Some helpful definitions follow.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Electrically Connected: means either directly electrically connected, or indirectly electrically connected, such that intervening elements are present; an electrical connection may include, but need not be limited to, elements such as capacitors, inductors, transformers, vacuum tubes, and the like.

Mechanically connected: Includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for edge device self-orchestration in a spatial network community, the method comprising:
    initializing a first deep neural network (DNN) for a local deep reinforcement learning (DRL) network of a first local cluster of edge devices including a first edge device;
    receiving, by the first edge device in the spatial network community, a first task into a local task queue of tasks to be performed by the first edge device;
    assigning, by the first edge device, a first class to the first task based on deadline requirements;
    determining, by the local DRL network, to execute the first task by remote execution based on constraints represented by the assigned first class;
    responsive to determining to execute the first task by remote execution, sending, by the first edge device, a request for help signal to a sub-set of edge devices in the spatial network community, the sub-set of edge devices having edge device profiles demonstrating characteristics aligned with the constraints represented by the assigned first class; and
    offloading, by the first edge device, the first task to a selected edge device based on a dataset returned by the selected edge device responsive to the request for help signal.

2. The method of claim 1, wherein the first class defines a delay-sensitivity level of the first task.

3. The method of claim 1, further comprising:
    initializing a second DNN for a remote DRL network including a plurality of local clusters including the first local cluster;
    wherein:
    the response to the request for help signal is performed by the remote DRL network;
    the local DRL network is based on online deep policy gradient algorithm with importance sampling with reference to an old sample data of an existing policy; and
    the remote DRL network is based on a DRL-based offloading schedule with the old sample data being replaced with new sample data for each training epoch.

4. The method of claim 1, wherein:
    responses from the sub-set of edge devices to the request for help signal include edge device state information for each responding edge device; and
    selecting the select edge device based on the edge device state information provided by the select edge device.

5. The method of claim 1, further comprising:
    identifying the sub-set of edge devices according to geographic proximity to the first edge device, the assigned first class indicating the first task is a delay-sensitive task; and
    analyzing, for each responsive edge device, respective responses to the request for help signal;
    wherein:
    the select edge device is selected from among the sub-set of edge devices by application of a cost function with respect to minimizing cost of the first edge device in view of the select edge device.

6. The method of claim 5, wherein:
    the sub-set of edge devices and the first edge device are each at a series of road traffic signals, each road traffic signal including one of the edge devices, and the series of road traffic signals making up the spatial network community; and
    the geographic proximity is within the series of traffic signals at a traffic flow intersection where the first edge device is located.

7. The method of claim 1, wherein:
    the first class is one of three classes of tasks, delay-sensitive tasks, delay-constrained tasks, and delay-tolerant tasks; and
    offloading tasks to edge devices is based, at least in part, on characteristics of the edge device as defined by the three classes of tasks, delay-sensitive tasks requiring performance within a geographic cluster of edge devices, delay-constrained tasks permitting performance by an edge server within the spatial community of edge devices, and the delay-tolerant tasks permitting performance by a cloud server.

8. A computer program product for edge device self-orchestration in a spatial network community, the computer program product comprising a non-transitory computer readable storage medium having a set of instructions stored therein which, when executed by a processor, causes the processor to perform a method comprising:
    initializing a first deep neural network (DNN) for a local deep reinforcement learning (DRL) network of a first local cluster of edge devices including a first edge device;
    receiving, by the first edge device in the spatial network community, a first task into a local task queue of tasks to be performed by the first edge device;
    assigning, by the first edge device, a first class to the first task based on deadline requirements;
    determining, by the local DRL network, to execute the first task by remote execution based on constraints represented by the assigned first class;
    responsive to determining to execute the first task by remote execution, sending, by the first edge device, a request for help signal to a sub-set of edge devices in the spatial network community, the sub-set of edge devices having edge device profiles demonstrating characteristics aligned with the constraints represented by the assigned first class; and
    offloading, by the first edge device, the first task to a selected edge device based on a dataset returned by the selected edge device responsive to the request for help signal.

9. The computer program product of claim 8, wherein the first class defines a delay-sensitivity level of the first task.

10. The computer program product of claim 8, further causing the processor to perform a method comprising:
    initializing a second DNN for a remote DRL network including a plurality of local clusters including the first local cluster;
    wherein:
    the response to the request for help signal is performed by the remote DRL network;
    the local DRL network is based on online deep policy gradient algorithm with importance sampling with reference to an old sample data of an existing policy; and
    the remote DRL network is based on a DRL-based offloading schedule with the old sample data being replaced with new sample data for each training epoch.

11. The computer program product of claim 8, wherein:
    responses from the sub-set of edge devices to the request for help signal include edge device state information for each responding edge device; and
    selecting the select edge device based on the edge device state information provided by the select edge device.

12. The computer program product of claim 8, further causing the processor to perform a method comprising:
identifying the sub-set of edge devices according to geographic proximity to the first edge device, the assigned first class indicating the first task is a delay-sensitive task; and
analyzing, for each responsive edge device, respective responses to the request for help signal;
wherein:
the select edge device is selected from among the sub-set of edge devices by application of a cost function with respect to minimizing cost of the first edge device in view of the select edge device.

13. The computer program product of claim 12, wherein:
the sub-set of edge devices and the first edge device are each at a series of road traffic signals, each road traffic signal including one of the edge devices, and the series of road traffic signals making up the spatial network community; and
the geographic proximity is within the series of traffic signals at an traffic flow intersection where the first edge device is located.

14. A computer system for edge self-orchestration in a spatial network community, the computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to perform a method comprising:
initializing a first deep neural network (DNN) for a local deep reinforcement learning (DRL) network of a first local cluster of edge devices including a first edge device;
receiving, by the first edge device in the spatial network community, a first task into a local task queue of tasks to be performed by the first edge device;
assigning, by the first edge device, a first class to the first task based on deadline requirements;
determining, by the local DRL network, to execute the first task by remote execution based on constraints represented by the assigned first class;
responsive to determining to execute the first task by remote execution, sending, by the first edge device, a request for help signal to a sub-set of edge devices in the spatial network community, the sub-set of edge devices having edge device profiles demonstrating characteristics aligned with the constraints represented by the assigned first class; and
offloading, by the first edge device, the first task to a selected edge device based on a dataset returned by the selected edge device responsive to the request for help signal.

15. The computer system of claim 14, wherein the first class defines a delay-sensitivity level of the first task.

16. The computer system of claim 14, further causing the processor to perform a method comprising:
initializing a second DNN for a remote DRL network including a plurality of local clusters including the first local cluster;
wherein:
the response to the request for help signal is performed by the remote DRL network;
the local DRL network is based on online deep policy gradient algorithm with importance sampling with reference to an old sample data of an existing policy; and
the remote DRL network is based on a DRL-based offloading schedule with the old sample data being replaced with new sample data for each training epoch.

17. The computer system of claim 14, wherein:
responses from the sub-set of edge devices to the request for help signal include edge device state information for each responding edge device; and
selecting the select edge device based on the edge device state information provided by the select edge device.

18. The computer system of claim 14, further causing the processor to perform a method comprising:
identifying the sub-set of edge devices according to geographic proximity to the first edge device, the assigned first class indicating the first task is a delay-sensitive task; and
analyzing, for each responsive edge device, respective responses to the request for help signal;
wherein:
the select edge device is selected from among the sub-set of edge devices by application of a cost function with respect to minimizing cost of the first edge device in view of the select edge device.

19. The computer system of claim 18, wherein:
the sub-set of edge devices and the first edge device are each at a series of road traffic signals, each road traffic signal including one of the edge devices, and the series of road traffic signals making up the spatial network community; and
the geographic proximity is within the series of traffic signals at an traffic flow intersection where the first edge device is located.

20. The computer system of claim 14, wherein:
the first class is one of three classes of tasks, delay-sensitive tasks, delay-constrained tasks, and delay-tolerant tasks; and
offloading tasks to edge devices is based, at least in part, on characteristics of the edge device as defined by the three classes of tasks, delay-sensitive tasks requiring performance within a geographic cluster of edge devices, delay-constrained tasks permitting performance by an edge server within the spatial community of edge devices, and the delay-tolerant tasks permitting performance by a cloud server.

* * * * *